(12) United States Patent
Green

(10) Patent No.: US 6,263,340 B1
(45) Date of Patent: Jul. 17, 2001

(54) USER REGISTRATION IN FILE REVIEW SYSTEMS

(75) Inventor: Robin Arthur Green, Toronto (CA)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/176,087

(22) Filed: Oct. 20, 1998

(51) Int. Cl.[7] .................................................. G06F 17/00
(52) U.S. Cl. ......................... 707/102; 707/1; 707/4; 707/8; 707/9; 707/10; 705/48; 705/75
(58) Field of Search .................. 707/1, 4, 7, 8, 707/9, 10, 102; 705/48, 75; 709/224, 229; 713/156; 379/201

(56) References Cited

U.S. PATENT DOCUMENTS

| | | | |
|---|---|---|---|
| 5,708,780 | * | 1/1998 | Levergood et al. ............ 395/200.12 |
| 5,867,799 | * | 2/1999 | Lang et al. .......................... 707/1 |
| 5,915,023 | * | 6/1999 | Bernstein ........................... 705/75 |
| 6,052,728 | * | 4/2000 | Fujiyama et al. ................ 709/224 |
| 6,104,798 | * | 8/2000 | Lickiss et al. .................... 379/201 |
| 6,175,831 | * | 1/2001 | Weinreich et al. ................ 707/10 |

\* cited by examiner

*Primary Examiner*—Thomas Black
*Assistant Examiner*—Diane D. Mizrahi
(74) *Attorney, Agent, or Firm*—Edward H. Duffield

(57) ABSTRACT

A file review system includes a mechanism for the auto-registration of users. An author of a file in a file review system defines one or more user profiles. A new user of the system is provided with a user identification and password for a user profile. The user profile has data associated with it to restrict or permit access to the file or to functionality associated with the file review. The new user is assigned a new user definition which inherits the data of the user profile. The new user definition is then used by the new user to access the file of the file review, in the manner defined by the author.

11 Claims, 2 Drawing Sheets

| USERID | |
|---|---|
| INITIAL PASSWORD | |
| FIRST NAME | |
| LAST NAME | |
| E-MAIL ADDRESS | |

( RESET )  ( CANCEL )  ( SUBMIT )

FIGURE 2

USER REGISTRATION IN FILE REVIEW SYSTEMS

FIELD OF THE INVENTION

The present invention is directed to an improvement in computing systems and in particular to the registration of users in file review systems.

BACKGROUND OF THE INVENTION

It is a common practice for the author of a document to make the document available on a computer system for review. This permits other users who have access to the computer system (either directly or over a network connection) to make comments on the document. These comments may be included in the document or may be viewable with reference to the original document in some other manner.

Word processors and other computer software are available to permit such comments or annotations to be entered in, or in association with, a given document. Such systems may relate to text documents, structured documents, or other types of computer-readable data stored in files. In general, such systems are file review systems in that the systems permit files of data to be reviewed and comments made in association with the files.

When such comments are inserted in a document, it is important to consistently identify comment authors (or reviewers). The writer of the original document may need to contact a reviewer for additional information, and a reviewer who chooses to use an alias or initials may be difficult to contact. In addition, certain file review systems are customizable to tailor the display or manipulation options for certain documents based on the identity of the reviewer. A file review system may filter comments based on the identity of the reviewer, or the identity of the person who has left the comment. It is therefore important in such systems to ensure that the reviewer is correctly identified and recognized by the system so that the document may be appropriately customized for the reviewer, both in terms of the display and the functionality available for the reviewer.

One approach is to require reviewers to enter their names when starting to review a document. However, reviewers who are forced to enter their names manually may use variants of their names in different comments. This will create difficulties for systems which provide for the process of filtering or searching for comments by a particular reviewer.

Another approach to this problem is to keep track of the reviewers by a machine, network or system identifier such as an IP address. This approach has the benefit of removing the variability of the user or reviewer entering a name or initials. When a new identifier is encountered by the system accepting a comment, the user can be asked to enter a name. Each time a reviewer with this identifier appends a comment, the stored name is assigned to the comment.

Basing reviewer identification on identifiers which are intrinsic to machines or systems presents limitations when reviewers wish to enter comments from different machines or systems, or those machines or systems are changed. These problems may result in comments being attributed to the wrong reviewer, which makes follow-up by the writer of the document being reviewed difficult and sometimes embarrassing.

It is therefore desirable to have a file review system which permits users to identify themselves to the system but to do so in a constrained manner to prevent inconsistent identification or misidentification in the file review system. It is also desirable to have a file review system in which an author or administrator may pre-define levels of access and provide different groups of potential users with different levels of access.

SUMMARY OF THE INVENTION

According to one aspect of the present invention, there is provided an improved system and method for registration of users in a file review system.

According to another aspect of the present invention there is provided a user registration system for a file review system, the file review system providing users with selectively defined access authority to files in the file review system, the user registration system comprising:

(a) means for a first defined user to create one or more user profiles, each of the one or more user profiles comprising a set of user identifiers, (the user identifiers comprising a user ID and a password), and a set of user access data representing file access authority (comprising data for access authority for each file in the file review system)

(b) registration means for one or more second users to register in the file review system by each one of the second users selecting a one of the one or more user profiles, the registration means creating a unique second user definition for each of the second users, the second user definition comprising a set of log on identifiers, and a set of user definition access data, the user definition access data being derived from the user profile selected by each one of the one or more second users, the registration means further comprising means for each of the second users to log on to the file review system using each second user's log on identifier and means for associating each logged on second user with the corresponding user definition to define the system access authority for each logged on second user.

According to another aspect of the present invention there is provided the above user registration system in which the user definition further comprises a set of personal identifiers including one or more of user name, user address, and user e-mail address.

According to another aspect of the present invention there is provided the above user registration system in which the file review system is implemented in an HTML environment and in which the registration means comprises HTML forms made available to HTML browsers of the one or more second users.

According to another aspect of the present invention there is provided an HTML-based user registration system for a web-based file review system, the file review system providing a plurality of users with selectively defined access authority to files in the file review system, the user registration system comprising (a) a common gateway interface program code means for a first defined user to create one or more user profiles, each of the one or more user profiles comprising a set of user identifiers, and a set of user access data representing file access authority (b) a common gateway interface program code registration means for one or more second users to register in the file review system by each one of the second users selecting a one of the one or more user profiles, the common gateway interface program code registration means creating a unique second user definition for each of the second users, the second user definition comprising a set of log on identifiers, and a set of user definition access data, the user definition access data being derived from the user profile selected by each one of the one or more second users, the common gateway interface program code registration means further comprising means for each of the second users to log on to the file review system using each second user's log on identifier and means for associating each logged on second user with the corresponding user definition to define the system access authority for each logged on second user.

According to another aspect of the present invention there is provided a computer program product for use with a file review system, the file review system providing users with selectively defined access authority to files in the file review system, computer program product comprising:

a computer usable medium having computer readable program code means embodied in said medium for user registration, the computer program product having:

computer readable program code means for causing a computer, at the request of a first defined user, to create one or more user profiles, each of the one or more user profiles comprising a set of user identifiers, and a set of user access data representing file access authority computer readable program code registration means for causing a computer to register one or more second users in the file review system by each one of the second users selecting a one of the one or more user profiles, creating a unique second user definition for each of the second users, the second user definition comprising a set of log on identifiers, and a set of user definition access data, the user definition access data being derived from the user profile selected by each one of the one or more second users, at the request of any one of the registered second users, permitting log on to the file review system by using each second user's log on identifier associating each logged on second user with the corresponding user definition to define the system access authority for each logged on second user.

According to another aspect of the present invention there is provided a method for registration of users in a file review system, the file review system providing users with selectively defined access authority to files in the file review system, the method comprising the steps of:

(a) responding to a request from a first defined user by creating one or more user profiles, each of the one or more user profiles comprising a set of user identifiers, and a set of user access data representing file access authority, (b) responding to a request from a one of the second users to register in the file registration system by the one of the second users selecting a one of the one or more user profiles, (c) creating a unique second user definition for the one of the second users, the second user definition comprising a set of log on identifiers, and a set of user definition access data, the user definition access data being derived from the user profile selected by each one of the one or more second users, (d) enabling each of the registered second users to log on to the file registration system using each second user's log on identifier and (e) associating each logged on second user with the corresponding user definition to define the system access authority for each logged on second user.

According to another aspect of the present invention there is provided a program storage device readable by a machine, tangibly embodying a program of instructions executable by the machine to perform method steps for registering users in a file review system, the method steps comprising the above steps.

Advantages of the present invention include the ability of an author of a file in a file review system to create different levels of access for the file and the comments on the file by creating different user profiles. The author may then provide a number of users with differing levels of access to the file and the comments by making available different user profiles to different potential users.

BRIEF DESCRIPTION OF THE DRAWINGS

The preferred embodiment of the invention is shown in the drawings, wherein:

FIG. 2 is a screen diagram showing a data entry screen for the system of the preferred embodiment.

Figure 1:
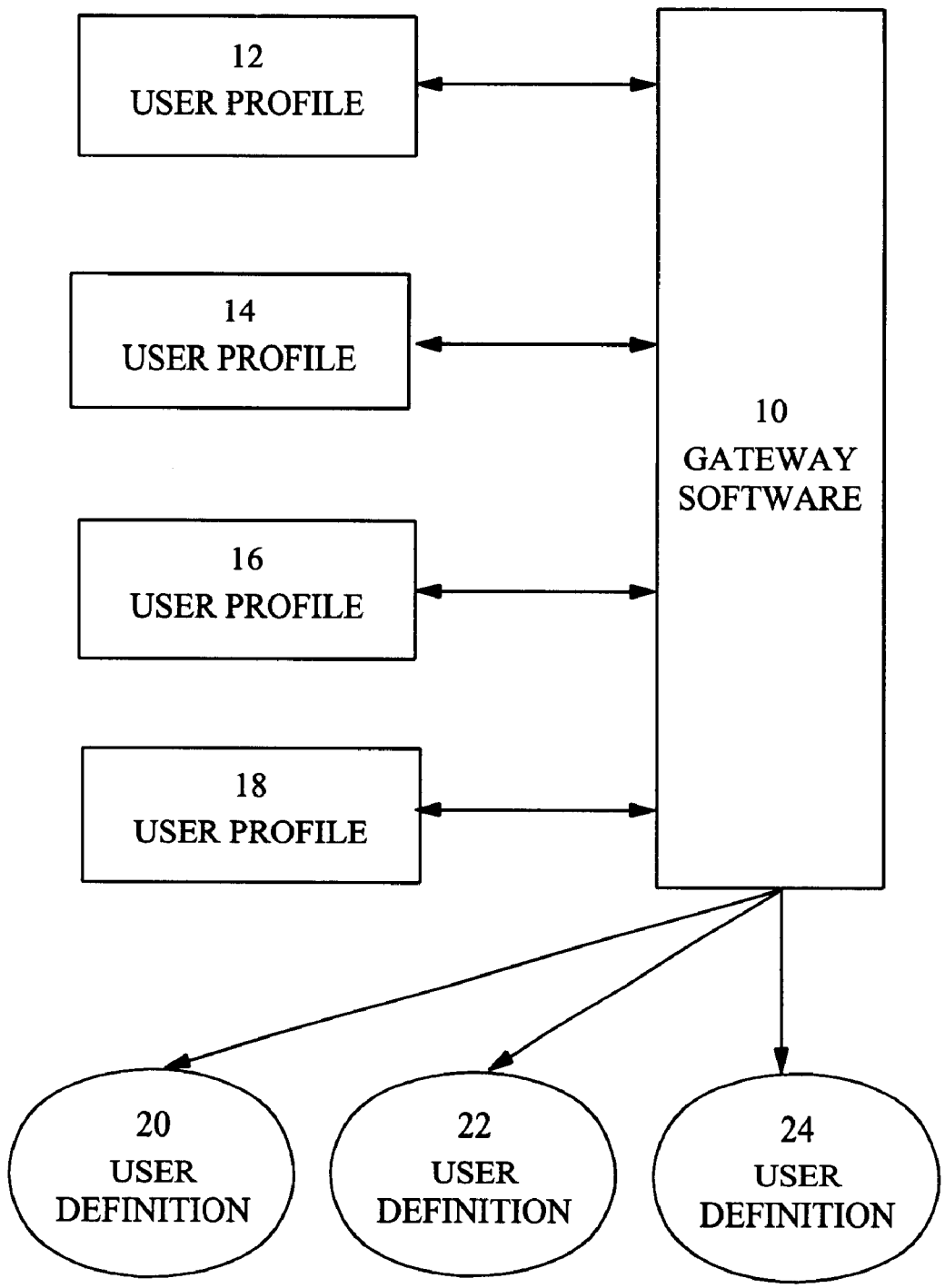
FIG. 1 is a block diagram showing the high-level structure of the system of the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

Referring to FIG. 1, there is illustrated in a block diagram view, a high-level representation of the system of the preferred embodiment. FIG. 1 represents gateway software 10, user profiles 12, 14, 16, 18, 20 and user definitions 20, 22, 24.

The preferred embodiment of the invention utilizes HTML documents to implement the registration of users for a file review system and the description below refers to such an HTML implementation. It will be understood by those skilled in the art, however, that the preferred embodiment may be implemented in other suitable computer environments.

The preferred embodiment of the invention provides that each user in a file review system be provided with a unique user identification, for user ID. The user ID has an associated password. This provides a limited amount of security in the system.

The preferred embodiment of the invention requires a user to fill out a logon screen to access a file to be reviewed. When a user logs on, the user ID and password are verified, and a key value associated with the user ID is retrieved.

This key is available for the file review system and may be used where appropriate to uniquely identify the user. For a file review system implemented in an HTML environment, the key value may be dynamically inserted into all CGI calls embedded in each document that the file review system returns to the reviewer. Each time the reviewer uses the CGI of the HTML system, the system will be able to determine the identity of the user making the CGI call. In this way, the key corresponding to the reviewer is embedded in each document which is sent from the reviewer to the system and from the system to the reviewer. The identity of the reviewer is therefore always available to the system.

Such a system of identifying users is also beneficial where different information about files or documents is displayed or made available to different users. The file review system may differentiate between authors of documents and reviewers of documents, and may also differentiate between different reviewers. By assigning user identifiers and key values to users the system can ensure that the correct customization parameters are applied to the correct users.

In such a system, users must be registered with the system before the system will allow access to the documents to be reviewed. In other words, users must log on to the system before using it. It is possible to permit users to initially log on to the system without any restrictions being imposed, other than ensuring that the user ID selected by the user is unique in the system. Such an approach is limiting and is also inappropriate where access to functions in the system is intended to be constrained for users in different classes (for example where authors have different functions available to them than do reviewers, a common design feature in file review systems).

The preferred embodiment provides a mechanism for permitting users to log on to a file review system for the first time using a predefined user profile. A system administrator, or author of a file or set of files in the file review system, is able to define one or more user profiles. These are shown as user profiles 12, 14, 16, 18 in FIG. 1. These profiles are defined by the author or administrator to have characteristics which will provide certain access rights and functionality in the system. For example, the author may specify that a particular user profile will be defined to permit reading of the document only. Another user profile may be created which will permit comments to be added to the author's document. Each user profile will have associated with it a user ID and a password. The user profiles may be thought of as dummy or template user definitions in that they fully define a user for the system, but are not given a key value and are not able to be directly used in the system, as is described below.

Once the system has defined user profiles, users may log on using the user ID and password of a user profile. When a user logs on with the user ID and password for a defined user profile, the user is prompted by the system to enter a new user ID and password. If the new user ID is unique in the system, a user definition is created for the user. The user definition is given the new user ID and password, and is given each of the characteristics found in the user profile with which the user first logged on.

The mechanism of auto-registration described above provides a new user with the access to the files of the file review system as defined in the user profile by the author or administrator when the new user logs on for the first time. If the user profile is later changed, the new user's access to the files is not changed. The new user inherits the access and other characteristics from the user profile at the time of logging on. In the mechanism of the preferred embodiment, there is no dynamic link established between the new user's user definition and the user profile which gave rise to the user definition.

Referring to FIG. 1, and author of a file or set of files may define user profiles 12, 14. The author provides the user ID and password associated with user profile 12 to UserA and those associated with user profile 14 to UserB. When UserA logs on to the system using the user ID and password of user profile 12, gateway software 10 (Common Gateway Interface software in the HTML environment of the preferred embodiment) provides the user with a form to permit UserA to enter a new user ID and password, and to provide other identification information. FIG. 2 shows a form which permits UserA to enter such new information into the system of the preferred embodiment.

FIG. 2 shows a screen for entry of user information. The screen is used to permit the user to register in the file system. The screen of FIG. 2 may be defined as a form in an HTML document. Box 30 represents a location for the user to enter a user ID. Boxes 32, 34, 36, 38 are similarly locations for the user to enter password, first name, last name and e-mail address, respectively. Buttons 40, 42, 44 are provided to permit the user to reset, cancel or submit the registration, respectively.

Once the form has been submitted, gateway software 10 creates a user definition, in this example, user definition 20, for UserA. User definition 20 is based on UserA's new user ID and password, and on user profile 12. In this way, UserA will be given the access to the file review system as defined by the author when the author set up user profile 12.

In a similar manner UserB can log on to the system for the first time using the user ID and password for user profile 14. UserB will be provided with user definition 22 by gateway software 10. User definition 22 is based on user profile 14. In this way UserB may be given different assess to the file system than was available to UserA.

This method of auto-registration permits the author of the document to provide access in a controlled way to different users, without having to define specific user accounts for all users who may wish to access the document.

There is some potential for unauthorized access to a file in the system if a user's key is seen by others. However, in many environments the level of security offered is practical and avoids incorrectly attributed comments.

The above auto-registration provides for uniform and constrained user identification within a system while permitting users to identify themselves to the system in a manner which is independent of the user's computer system.

Although a preferred embodiment of the present invention has been described here in detail, it will be appreciated by those skilled in the art, that variations may be made thereto, without departing from the spirit of the invention or the scope of the appended claims.

The embodiments of the invention which an exclusive property or privilege is claimed are defined as follows:

1. A user registration system for a file review system, the file review system providing users with selectively defined access authority to files in the file review system, the user registration system comprising means for the first defined user to create one or more user profiles, each of the one or more user profiles comprising a set of user identifiers, and a set of user access data representing file access authority registration means for one or more second users to register in the file review system by each one of the second users selecting a one of the one or more user profiles, the registration means creating a unique second user definition for each of the second users, the second user definition comprising a set of log on identifiers, and a set of user definition access data, the user definition access data being derived from the user profile selected by each one of the one or more second users, the registration means further comprising means for each of the second users to log on to the file review system using each second user's log on identifier and means for associating each logged on second user with the corresponding user definition to define the system access authority for each logged on second user.

2. The user registration system of claim 1 in which the set of user identifiers comprises a user ID and a password.

3. The user registration system of claim 1 in which the set of user access data comprises data for access authority for each file in the file review system.

4. The user registration system of claim 1 or claim 3 in which the set of user access data comprises data for default access authority across all files in the system.

5. The user registration system of claim 1 or claim 3 in which the user definition further comprises a set of personal identifiers.

6. The user registration system of claim 5 in which the user personal identifier comprises one or more of user name, user address, and user e-mail address.

7. The user registration system of claim 1 in which the file review system is implemented in an HTML environment and in which the registration means comprises HTML forms made available to HTML browsers of the one or more second users.

8. An HTML-based user registration system for a web-based file review system, the file review system providing a plurality of users with selectively defined access authority to files in the file review system, the user registration system comprising a common gateway interface program code means for a first defined user to create one or more user profiles, each of the one or more user profiles comprising
a set of user identifiers, and
a set of user access data representing file access authority a common gateway interface program code registration means for one or more second users to register in the file review system by each one of the second users selecting a one of the one or more user profiles, the common gateway interface program code registration means creating a unique second user definition for each of the second users, the second user definition comprising
a set of log on identifiers, and
a set of user definition access data, the user definition access data being derived from the user profile selected by each one of the one or more second users, the common gateway interface program code registration means further comprising means for each of the second users to log on to the file review system using each second user's log on identifier and means for associating each logged on second user with the corresponding user definition to define the system access authority for each logged on second user.

9. A computer program product for use with a file review system, the file review system providing users with selectively defined access authority to files in the file review system, computer program product comprising:

a computer usable medium having computer readable program code means embodied in said medium for user registration, the computer program product having:
computer readable program code means for causing a computer, at the request of a first defined user, to create one or more user profiles, each of the one or more user profiles comprising
a set of user identifiers, and
a set of user access data representing file access authority, computer readable program code registration means for causing a computer to register one or more second users in the file review system by each one of the second users selecting a one of the one or more user profiles, creating a unique second user definition for each of the second users, the second user definition comprising
a set of log on identifiers, and
a set of user definition access data, the user definition access data being derived from the user profile selected by each one of the one or more second users, at the request of any one of the registered second users, permitting log on to the file review system by using each second user's log on identifier associating each logged on second user with the corresponding user definition to define the system access authority for each logged on second user.

10. A method for registration of users in a file review system, the file review system providing users with selectively defined access authority to files in the file review system, the method comprising the steps of responding to a request from a first defined user by creating one or more user profiles, each of the one ore more user profiles comprising
a set of user identifiers, and
a set of user access data representing file access authority, responding to a request from a one of the second users to register in the file registration system by the one of the second users selecting a one of the one or more user profiles, creating a unique second user definition for the one of the second users, the second user definition comprising
a set of log on identifiers, and
a set of user definition access data, the user definition access data being derived from the user profile selected by each one of the one or more second users, enabling each of the registered second users to log on to the file registration system using each second user's log on identifier and associating each logged on second user with the corresponding user definition to define the system access authority for each logged on second user.

11. A program storage device readable by a machine, tangibly embodying a program of instructions executable by the machine to perform method steps for registering users in a file review system, the method steps comprising the steps of claim 10.

* * * * *